March 22, 1955 W. W. PHARIS 2,704,787

TELEPHONE TRUNK SUPERVISORY CIRCUIT

Filed Dec. 1, 1949 2 Sheets-Sheet 1

INVENTOR.
WILLIAM W. PHARIS
BY T. L. Bowes
ATTORNEY

INVENTOR.
WILLIAM W. PHARIS
BY
T. L. Bowes
ATTORNEY

United States Patent Office 2,704,787

Patented Mar. 22, 1955

2,704,787

TELEPHONE TRUNK SUPERVISORY CIRCUIT

William W. Pharis, Rochester, N. Y., assignor to Stromberg-Carlson Company, a corporation of New York Application December 1, 1949, Serial No. 130,418

22 Claims. (Cl. 179—27)

Figure 1:
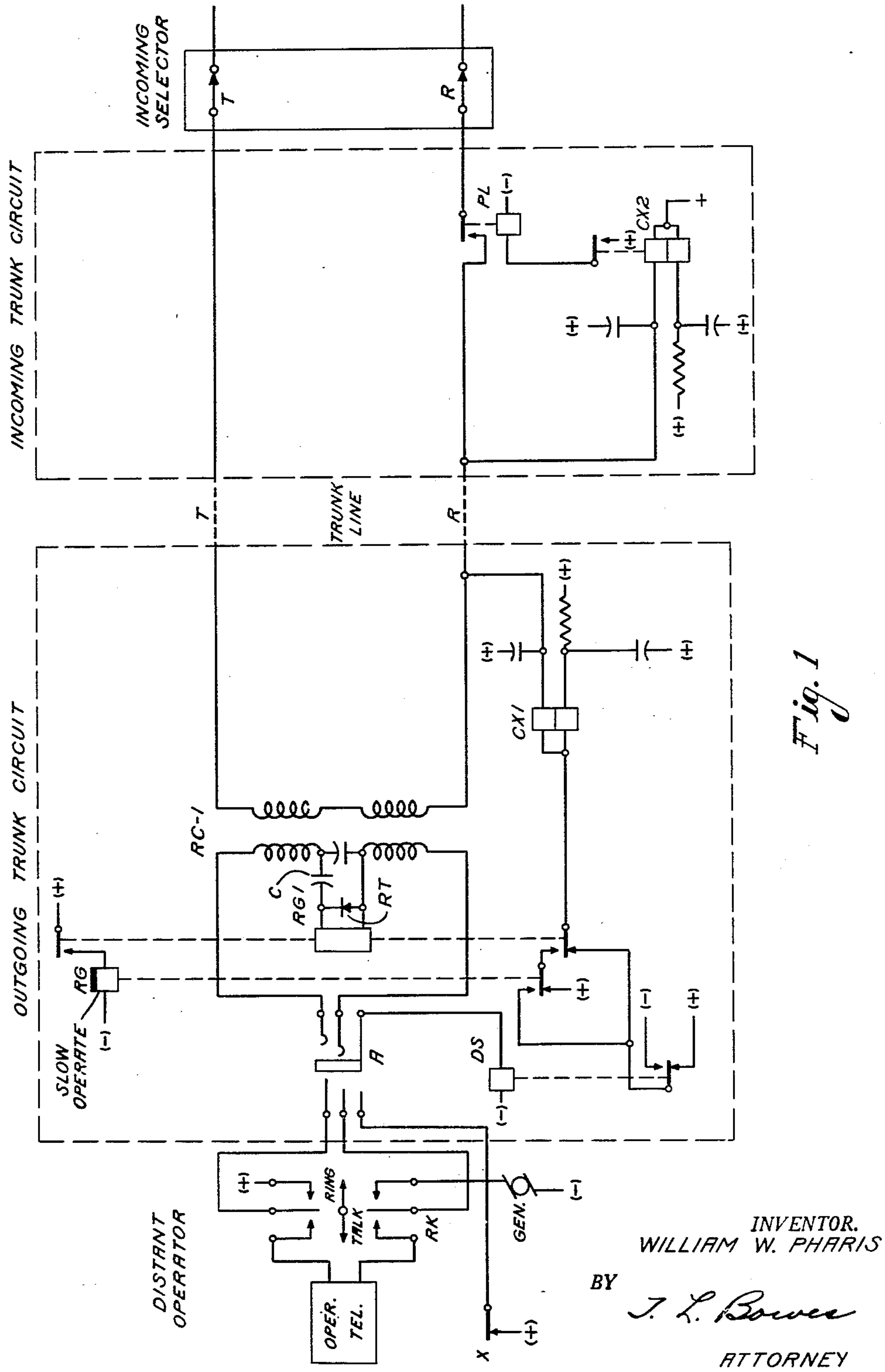

This invention relates to electrical circuit control devices, and more particularly to circuit control devices of the type governed by the reception of pulses from external sources.

Devices of the class contemplated by my invention may be used to change the status of an electrical circuit from a first condition to a second condition. These conditions may be "on" and "off," respectively, or they may be high or low impedance conditions, or some other alteration of the circuit status that must be controlled.

The electrical circuit controlling devices of the pulse-controlled class are found in many fields of art, and my invention is likewise applicable to the control of many types of circuits. In particular, my invention is applicable to the field of automatic telephony, especially in operator recall arrangements on calls of the "intertoll" type. I have consequently chosen to illustrate my invention as applied to such an operator recall arrangement, but I wish to be expressly understood that my invention is not limited thereto.

It is primarily an object of my invention to provide an electrical circuit controlling device governed by pulses received from external sources.

It is also an object of my invention to provide a circuit controlling device in which a pulse from one source changes the status of the circuit from a first to a second condition, and in which a particular pulse from another source causes the device to revert to its unactuated state and causes the circuit to change back from the second to the first condition.

It is a further object of my invention to provide an electrical circuit controlling device which changes the circuit from a first condition to a second condition responsive to the receipt of a pulse from a first source of pulses, and which reverts to its unactuated state and changes the circuit from the second to the first condition responsive only to the termination of the last of a plurality of pulses received from a second source of pulses.

It is a still further object of my invention to provide an operator recall circuit in a telephone connection of the intertoll type, in which the transmission of a pulse from a first exchange causes a signaling device at a second exchange associated with a trunk connecting the first and second exchanges to operate and to remain operated until the last of a plurality of pulses received from a second source of pulses is terminated.

It is yet another object of my invention to provide an operator recall circuit in a telephone connection of the intertoll type, in which the transmission of a pulse from a first exchange causes a supervisory lamp at a second exchange associated with a trunk connecting the first and second exchanges to light and remain lighted until the last of a plurality of pulses received from a source of pulses located at the second exchange is terminated.

Further objects and advantages of my invention will become apparent as the following description proceeds, and the features of novelty which characterize my invention will be pointed out with particularity in the claims annexed to and forming a part of this specification.

When an intertoll call has been set up, it frequently occurs that the operator at the first (or originating) exchange wishes to attract the attention of the operator at the second (called) exchange. This is known as "recalling" the second operator. One of the standard intertoll recall signals is to steadily operate, for one-half to two seconds, a signaling device (usually a supervisory lamp) associated with the trunk interconnecting the two exchanges. To produce this signal at the second exchange, intertoll circuits are so arranged that the operator at the first exchange need only operate the ringing key associated, through a cord circuit, with the trunk. Alternating ringing current is thus applied to the outgoing trunk circuit. The outgoing trunk circuit is arranged to transmit an impulse of 50–120 milliseconds' duration to the second exchange, where the supervisory lamp is lighted for the one-half to two-second interval. The first exchange thus includes a first source of pulses to initiate action of the signaling device (shown herein as a supervisory lamp) at the second exchange.

The signaling device is de-actuated after the required one-half to one second interval by some sort of timing means. It is in this aspect of intertoll operator recall circuits that my invention has particular application. To accomplish the previously mentioned and other objects of my invention, I provide apparatus for governing the duration of signaling device operation which is controlled by a second source of pulses. In particular, I provide apparatus which will maintain the illumination of a supervisory lamp until the termination of the last of a predetermined number of pulses is received from this second source of pulses. In the preferred embodiment of my invention explained in this specification, the predetermined number of pulses is two.

Figure 2:
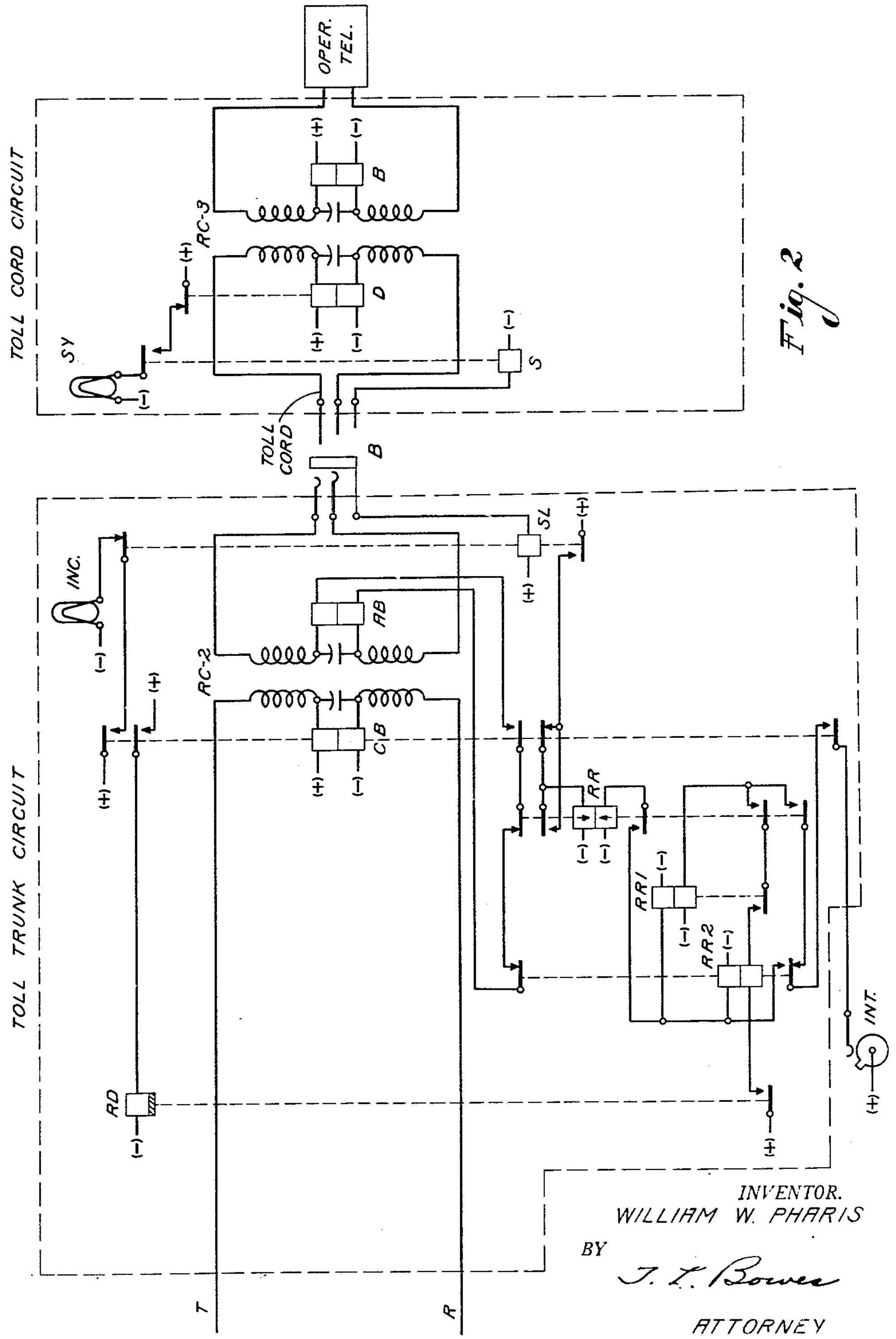

For a better understanding of my invention, reference may be had to the accompanying drawing in which Fig. 1, when laid at the left of Fig 2 with corresponding lines in alignment, shows my invention applied to an operator recall arrangement on a call between intertoll operators.

In Fig. 1 there is diagrammed an outgoing trunk circuit at a first exchange, the trunk itself (represented by dashed lines T and R), an incoming trunk circuit and an incoming selector at a second exchange. In both Figs. 1 and 2, only those elements of the circuits have been drawn which are necessary to an explanation of this application of my invention. For example, only the brushes of the incoming selector have been shown, and all the contacts in the banks of the selector switch, except those of the circuit in question, have been omitted as extraneous to this discussion. It is felt that the unadorned basic circuit will permit more rapid comprehension. Fig. 2 shows a toll trunk circuit including one embodiment of my invention. This embodiment comprises relays RR, RR1 and RR2. Also shown in Fig. 2 is a toll cord circuit capable of being plugged into the toll trunk circuit. I have chosen to illustrate my invention as applied to an intertoll trunk circuit employing composite signaling. It will be readily apparent to those skilled in the art, however, that other types of trunk signaling, such as loop signaling, might readily be substituted.

To establish contact with the operator at the second exchange, the operator at the first exchange plugs a cord circuit into jack A (Fig. 1). Relay DS is operated over a circuit extending from (+), dial contacts X, sleeve conductor of plug and jack A, winding of DS to (—). Relay DS changes the potential of the composite circuit from (+) to (—). This operates relay CX2 at the second exchange over a circuit extending from (—), make contact of DS, break contact of RG1, upper winding of relay CX1, ring conductor R of the trunk line, upper winding of relay CX2, and eventually to (+). CX2 closes an obvious circuit for operating relay PL which in turn closes the loop circuit to the incoming selector.

The operator at the first exchange can now select a trunk leading to the toll trunk circuit by dialling the proper level of the selector. This is done by opening and reclosing, at contacts X of the dial, the operating circuit for DS the number of times corresponding to the digit required to select the proper incoming selector level. When the operating circuit for DS is opened, the potential of the composite circuit is changed from (—) back to (+). Relay CX2 therefore releases because its previously described operating circuit is broken. CX2 in turn releases PL which then opens the loop to the incoming selector.

When the operating circuit for DS is reclosed at X, CX2 reoperates and causes PL to reclose the loop circuit to the incoming selector. The impulses generated at dial contacts X result in openings and closings of the loop circuit to the incoming selector. These openings and closings cause the incoming selector to step to the proper level and hunt for an idle trunk in the well-known manner. At the end of the selection process, the incoming selector cuts through the tip and ring connectors of the chosen trunk to the toll trunk circuit.

A loop circuit is now established from (—), lower winding of CB, winding of RC2, ring brush R of the incoming selector, make contact of PL, ring side R of the trunk line, windings of repeat coil RC1, tip side T of the trunk line, tip brush T of the incoming selector, winding of RC2, upper winding of CB to (+).

Closure of this loop circuit causes the operation of relay CB. CB operates RD and also causes the incoming lamp INC to light over a circuit extending from (+), make contact of CB, break contact of relay SL and lamp INC to (—). Relay CB also prepares a path for relay AB to be operated when the operator at the second exchange answers the call.

The lighting of INC announces to the operator that a call is waiting at jack B. To answer the call, the operator at the second exchange plugs an idle cord circuit into jack B. This act places relays S and SL in series, operating both. Relay SL extinguishes lamp INC.

The act of plugging the toll cord circuit into jack B establishes a circuit for the operation of relay D. This circuit extends from (—), lower winding of relay D, winding of RC3, ring side of cord, plug, and jack B, winding of RC2, lower winding of AB, break contact of RR2, break contact of RR, make contact of CB, upper winding of AB, winding of RC2, tip side of jack B, plug and cord of the toll cord, winding of RC3, upper winding of relay D to (+). A circuit for operating lamp SY is closed at a make contact of relay S, but is held open at a break contact of relay D. The act of plugging in enables the operator at the first exchange to converse with the operator at the second exchange.

To recall the operator at the second exchange, the operator at the first exchange operates ringing key RK of the cord circuit plugged into jack A. This sends ringing current from generator GEN through repeating coil RC1 at the first exchange to operate relay RG1. RG1 is preferably made responsive to alternating current by means of rectifier RT and capacitor C, although any method of doing so may be acceptable. RG1 closes an obvious circuit for energizing relay RG. Relay RG is made slow to operate, and consequently operates at some time which, under intertoll standards, may be from 50 to 120 milliseconds after its energization. Upon energization of RG1, prior to the operation of RG, the composite circuit potential is changed from (—) to (+). This circuit may then be traced from (+), break contact of RG, make contact of RG1, upper winding of CX1, ring conductor R of the trunk line, upper winding of relay CX2, break contact of SR to (+). Inasmuch as (+) is now standing on both leads of the upper winding of CX2, this relay releases and in turn releases relay PL. PL then opens the talking loop leading to the toll trunk circuit.

As soon as relay RG completes its operation, it returns the composite circuit from (+) to (—) potential. The composite circuit now extends from (—), make contact of RG, make contact of RG1, upper winding of CX1, ring conductor R of the trunk line, upper winding of CX2, break contact of SR to (+). This change of potential on the composite circuit causes the re-operation of CX2. CX2 recloses the obvious operating circuit of PL, and PL consequently recloses the talking loop to the toll trunk circuit. It is thus seen that a positive potential is applied to line R during the interval between the operation of relays RG1 and RG and constitutes the sending of a single open-circuit pulse from the first exchange to the second exchange in response to suitable action on the part of the operator at A.

Since relay CB is operated as previously described over this talking loop when the talking loop is closed, the 50–120-millisecond pulse sent from the outgoing trunk circuit at the first exchange results in the release of relay CB and its subsequent re-operation from 50 to 120 milliseconds later. Relay RD, being slow to release, is held up during the release time of CB. (The incoming selector does not release during this 50–120 millisecond interval because it too has a slow-to-release relay, as is well known to those skilled in the art.)

The release of CB opens the energizing path for relay D. The release of relay D in turn causes the supervisory lamp SY, associated by means of plug and jack B with the trunk, to be illuminated over a circuit extending from (+), break contact of D, make contact of S, lamp SY to (—).

The release of relay CB also energizes the upper winding of relay RR over a circuit extending from (+), make contact of SL, break contact of CB, upper winding of RR to (—). Relay RR locks itself to the (+) potential supplied through the SL contacts. Relay RR opens up another point in the loop circuit to relay D, so that when CB re-operates at the end of the 50–120 millisecond interval, lamp SY is still maintained in its off condition. Relay RR, upon the re-operation of relay CB, prepares a path for the operation of relay RR1 when a pulse of (+) potential is sent to the toll trunk circuit by the interrupter INT. This circuit extends from (+), interrupter INT, make contact of relay CB, break contact of RR2, make contact of RR, lower winding of RR1 to (—).

Interrupter INT constitutes a second source of pulses, that is, it is entirely separate from the first pulse source formed by relays RG1 and RG in the outgoing trunk circuit. Interrupter INT may be arranged to rotate at a uniform speed, thus supplying a number of timing pulses of (+) potential in a given time interval. The number of pulses supplied in this interval depends on the speed of rotation of INT. Other pulsing means may be employed instead of the interrupter INT shown; for example, in some applications it might be desirable to have a manually operated key in place of interrupter INT.

The lower winding of relay RR2 is not energized as a result of the operation of relay RR1 because there is (+) present on both its leads of its operating winding. However, at the termination of the first pulse from INT, the lower winding of RR2 is energized in series with the lower winding of RR1, the circuit extending from (+), make contact of RD, lower winding of RR2, make contact of RR1, make contact of RR, lower winding of RR1 to (—). As a result, relay RR2 operates and opens the loop circuit to relay D at still another point. RR2 also switches the path from INT to the upper windings of relays RR1 and RR2 and the lower winding of RR in preparation for the receipt of a second pulse from INT. When the second pulse arrives, the upper windings of RR1 and RR2 and the lower winding of RR are energized. Although this pulse locks up RR1 and RR2, it causes the release of RR because RR is differentially wound. RR consequently releases. In doing so it opens the circuit for the energization of the lower windings of RR1 and RR2, restores its break contact in the loop circuit to D, unlocks itself, and opens up the original energizing circuit from INT to the lower winding of RR1. When the second pulse from INT is terminated, thus removing (+) from INT, the energizing circuit for RR1 and RR2 is broken, thus releasing these relays and restoring the circuit controlling portion of the toll recall circuit to its unactuated condition. The release of RR2 recloses the last remaining open contact in the loop circuit to relay D. Relay D consequently re-operates and breaks the energizing circuit for lamp SY.

It is thus seen that the lamp SY is lighted from the time at which the beginning of the pulse from the outgoing trunk circuit is received by the toll trunk circuit until the termination of the second (+) pulse from INT. It is also seen that the recall circuit in this embodiment of my invention is restored to its unactuated condition in preparation for a subsequent recall operation if necessary. The single flash of light is used because it distinguishes from other flashing and steady signals employed to apprise the operator of other conditions. By making interrupter INT supply a larger or a smaller number of pulses per unit of time, the single flash of light from the SY lamp may be made to last a longer or a shorter time as desired. It is contemplated that the proper legnth of time for lamp SY to be illuminated should lie between one-half and two seconds. Time intervals within this range can be supplied if the interrupter INT pulse frequency is 30, 60 or 120 pulses per minute. These pulse rates are generally avaiable at a telephone exchange.

Although I have shown and described my invention as applied to a telephone recall circuit, many other uses are possible, as already pointed out in this specification. Some applications may require the use of pulses of a type different from those herein explained, such as (—) instead of (+), for example. However, modification of the embodiment of my invention herein explained will be readily apparent to those skilled in the art. Likewise it will be apparent to those skilled in the art that other means, such as vacuum tubes, may be employed in place of the relays used in the embodiment I have shown. Still other modifications will readily occur to those skilled in the various arts to which my invention may have application. I do not therefore desire my invention to be limited to the specific arrangement shown and described, and I intend in the appended claims to cover all modifications within the spirit and scope of my invention.

What I claim is:

1. A telephone system including a telephonist's station; a line; means for setting up a connection extending from said telephonist's station over said line; signal transmitting means at said telephonist's end of the line controlled by said telephonist; and at the other end of the line signal receiving means, pulse generating means, pulse counting means, an operator's position and a signal indicating device at said position; said signal receiving means having means responsive to the receipt of a signal from said transmitting means for causing said signal indicating device to be changed from a first to a second condition and said pulse counting means to be placed under the control of said pulse generating means; and said pulse counting means also having means responsive to the receipt of a predetermined number of pulses from said pulse generating means for causing said signal indicating device to be changed back to its first condition independently of the termination of the signal received over said line.

2. A telephone system including a telephonist's station; a line; means for setting up a connection extending from said telephonist's station over said line; signal transmitting means at said telephonist's end of the line controlled by said telephonist; and at the other end of the line signal receiving means, pulse generating means, pulse counting means, an operator's position and a signal indicating device at said position; said signal receiving means having means responsive to the receipt of a signal from said transmitting means for causing said signal indicating device to be changed from a first to a second condition and a pulsing circuit from said pulse generating means to said pulse counting means to be prepared, said signal receiving means also having means responsive to the termination of said signal for causing said pulsing circuit to the counting means to be closed; and said pulse counting means having means responsive to the receipt of a predetermined number of said pulses for causing said signal indicating device to be changed back to its first condition.

3. A telephone system including a telephonist's station; a line; means for setting up a connection extending from said telephonist's station over said line; signal transmitting means at said telephonist's end of the line controlled by said telephonist; and at the other end of the line signal receiving means, a plurality of pulse sources of pulsing rates such as used for the intermittent operation of switchboard lamps, a plurality of pulse leads each connected to one of said sources, pulse counting means, an operator's position and a signal indicating device at said position; said signal receiving means having means responsive to the receipt of a signal from said transmitting means for causing said signal indicating device to be changed from a first to a second condition and said pulse counting means to be connected to one of said pulse leads; and said pulse counting means having means responsive to the receipt of a predetermined number of pulses over said pulse lead for causing said signal indicating device to be changed back to its first condition, independently of the termination of the signal received over said line.

4. A telephone system comprising a telephonist's station; an operator's position; a line; means for setting up a connection over said line between said telephonist and said operator; signal transmitting means at said telephonist's end and signal receiving means at said operator's end of the line; means under the control of said telephonist for causing said signal transmitting means to transmit over said trunk signals of different duration; slow acting release means, pulse counting means and pulse generating means also at said operator's end of said line; and a signal indicating device at said operator's position; said signal receiving means having means responsive to the receipt of a signal from said transmitting means after said connection has been set up for causing said slow acting release means to be set in action, said signal indicating device to be changed from a first to a second condition and said pulse counting means to be placed under the control of said pulse generating means; said slow acting release means including means responsive to a received signal of more than a predetermined duration for causing said connection to be released; and said pulse counting means including means responsive to a received signal of less than said predetermined duration for causing said signal indicating device in response to the receipt of a predetermined number of pulses from said pulse generating means to be changed back to its first condition independently of the termination of the signal received over said line.

5. A telephone system comprising a telephonist's station; an operator's position; a line; means for setting up a connection over said line between said telephonist and said operator; signal transmitting means at said telephonist's end and signal receiving means at said operator's end of the line; means under the control of said telephonist for causing said signal transmitting means to transmit over said trunk signals of different duration; slow acting release means, pulse generating means and pulse counting means also at said operator's end of the line; and a signal indicating device at said operator's position; said signal receiving means having means responsive to the receipt of a signal from said transmitting means after said connection has been set up for causing said slow acting release means to be set in action, said signal indicating device to be changed from a first to a second condition and a pulsing circuit from said pulse generating means to said pulse counting means to be prepared, said signal receiving means also having means responsive to the termination of said signal for causing said pulsing circuit to the counting means to be closed; said slow acting release means including means responsive to a received signal of more than a predetermined duration for causing said connection to be released; and said pulse counting means including means responsive to a received signal of less than said predetermined duration for causing said signal indicating device to be changed back to its first condition in response to the receipt of a predetermined number of said pulses.

6. A telephone system comprising a telephonist's station; an operator's position; a line; means for setting up a connection over said line between said telephonist and said operator; signal transmitting means at said telephonist's end and signal receiving means at said operator's end of the line; means under the control of said telephonist for causing said signal transmitting means to transmit over said trunk signals of different durations; slow acting release means, a plurality of pulse sources of pulsing rates such as used for the intermittent operation of switchboard lamps, a plurality of pulse leads each connected to one of said sources and pulse counting means also at said operator's end of the line; said signal receiving means having means responsive to the receipt of a signal from said transmitting means after said connection has been set up for causing said slow acting release means to be set in action, said signal indicating device to be changed from a first to a second condition and said pulse counting means to be connected to one of said pulse leads; said slow acting release means including means responsive to a received signal of more than said predetermined duration for causing said connection to be released; and said pulse counting means including means responsive to a received signal of less than said predetermined duration for causing said signal indicating device in response to the receipt of a predetermined number of pulses over said pulse lead to be changed back to its first condition independently of the termination of the signal received over said line.

7. A telephone system comprising a calling operator's position in one office; a called operator's position in another office; an inter-office trunk; means for setting up a connection over said trunk between said calling and called operators; signal transmitting means at the calling end and signal receiving means at the called end of said trunk; disconnect means under the control of said calling operator for causing said signal transmitting means to transmit over said trunk a signal of more than a predetermined duration; signaling means under the control of said calling operator for sending a control signal to said signal transmitting means, said last mentioned means being means responsive to said control signal for transmitting a signal over said trunk which is limited to a duration less than said predetermined duration irrespective of the length of said control signal; slow acting release means, pulse generating means and pulse counting means also at said called end of the trunk; a signal device at said called operator's position; said signal receiving means having means responsive to receipt of a signal from said transmitting means after said connection has been set up for causing said slow acting release means to be set in action, said signal indicating device to be changed from a first to a second condition and said pulse counting means to be placed under the control of said pulse generating means; said slow acting release means including means responsive to a signal received over said trunk of more than said predetermined duration for causing said connection to be released; and said pulse counting means including means responsive to a signal received over said trunk of less than said predetermined duration for causing said signal indicating device in response to the receipt of a predetermined number of pulses from said pulse generating means to be changed back to its first condition, independently of the termination of the signal received over said trunk.

8. A telephone system comprising a calling operator's position in one office; a called operator's position in another office; an inter-office trunk; means for setting up a connection over said trunk between said calling and called operators; signal transmitting means at the calling end and signal receiving means at the called end of said trunk; disconnect means under the control of said calling operator for causing said signal transmitting means to transmit over said trunk a signal of more than a predetermined duration; signaling means under the control of said calling operator for sending a control signal to said signal transmitting means, said last mentioned means being means responsive to said control signal for transmitting a signal over said trunk which is limited to a duration less than said predetermined duration irrespective of the length of said control signal; slow acting release means, pulse generating means and pulse counting means also at said called end of the trunk; a signal indicating device at said called operator's position; said signal receiving means having means responsive to receipt of a signal from said transmitting means after said connection has been set up for causing said slow acting release means to be set in action, said signal indicating device to be changed from a first to a second condition, and a pulsing circuit from said pulse generating means to said pulse counting means to be prepared, said signal receiving means also including means responsive to the termination of said signal for causing said pulsing circuit to the pulse counting means to be closed; said slow acting release means including means responsive to a received signal of more than a predetermined duration for causing said connection to be released; and said pulse counting means including means responsive to a received signal of less than said predetermined duration for causing said signal indicating device in response to the receipt of a predetermined number of said pulses to be changed back to its first condition.

9. A telephone system comprising a calling operator's position in one office; a called operator's position in another office; an inter-office trunk; means for setting up a connection over said trunk between said calling and called operators; signal transmitting means at the calling end and signal receiving means at the called end of said trunk; disconnect means under the control of said calling operator for causing said signal transmitting means to transmit over said trunk a signal of more than a predetermined duration; signaling means under the control of said calling operator for sending a control signal to said signal transmitting means, said last mentioned means being means responsive to said control signal for transmitting a signal over said trunk which is limited to a duration less than said predetermined duration irrespective of the length of said control signal; slow acting release means, a plurality of pulse sources of pulsing rates such as used for the intermittent operation of switchboard lamps, a plurality of pulse leads each connected to one of said sources, and pulse counting means also at said called end of the trunk; a signal indicating device at said called operator's position; said signal receiving means having means responsive to receipt of a signal from said transmitting means after said connection has been set up for causing said slow acting release means to be set in action, said signal indicating device to be changed from a first to a second condition and said pulse counting means to be connected to one of said pulse leads; said slow acting release means including means responsive to a signal received over said trunk which is of more than said predetermined duration for causing said connection to be released; and said pulse counting means including means responsive to a signal received over said trunk which is of less than said predetermined duration for causing said signal indicating device in response to the receipt of a predetermined number of pulses over said pulse lead to be changed back to its first condition, independently of the termination of the signal received over said trunk.

10. A telephone system as claimed in claim 9 characterized in that said pulse counting means includes a differential relay having two windings, one of said windings being connected in a circuit controlled by said signal receiving means and being energized upon receipt of a signal by said means and the other winding being connected in a circuit controlled by said pulse source and being energized upon receipt of a pulse from said source, said differential relay having contacts controlling the condition of said signal indicating device.

11. A telephone system comprising a calling operator's position in one office; a called operator's position in another office; an inter-office trunk; means for setting up a connection over said trunk between said calling and called operators; signal transmitting means at the calling end and signal receiving means at the called end of said trunk; disconnect means under the control of said calling operator for causing said signal transmitting means to transmit over said trunk a signal of more than a predetermined duration; signaling means under the control of said calling operator for sending a control signal to said signal transmitting means, said last mentioned means being operative in response to said control signal to transmit a signal over said trunk which is limited to a duration less than said predetermined duration irrespective of the length of said control signal; slow acting release means, pulse generating means and pulse counting means also at said called end of the trunk; a signal indicating device at said called operator's position; said signal receiving means being means responsive to receipt of a signal from said transmitting means after said connection has been set up for causing said slow acting release means to be set in action, said signal indicating device to be changed from a first to a second condition and said pulse counting means to be placed under the control of said pulse generating means; said slow acting release means including means responsive to a signal received over said trunk which is of more than said predetermined duration for causing said connection to be released; and said pulse counting means including means responsive to a signal received over said trunk which is of less than said predetermined duration for causing said signal indicating device in response to the termination of the last of a predetermined number of pulses from said pulse generating means to be changed back to its first condition, independently of the termination of the signal received over said trunk, and said counting means to be prepared for a new counting operation under the control of another signal received over said trunk.

12. A telephone system comprising a calling operator's position in one office; a called operator's position in another office; an inter-office trunk; means for setting up a connection over said trunk between said calling and called operators; signal transmitting means at the calling end and signal receiving means at the called end of said trunk; disconnect means under the control of said calling operator for causing said signal transmitting means to transmit over said trunk a signal of more than a predetermined duration; a source of alternating current connected to said calling operator's position, a signaling key at said position for sending a splash of said alternating current to said signal transmitting means, said last mentioned means including an alternating current responsive device, said last mentioned means being means responsive to the receipt of said splash of current by said last mentioned device for transmitting a signal over said trunk which is limited to a duration less than said predetermined duration irrespective of the length of said splash of alternating current; slow acting release means, a plurality of pulse sources of pulsing rates such as used for the intermittent operation of switchboard lamps, and pulse counting means also at said called end of the trunk; a signal device at said called operator's position; said signal receiving means being means responsive to receipt of a signal from said transmitting means after said connection has been set up for causing said slow acting release means to be set in action, said signal indicating device to be changed from a first to a second condition and said pulse counting means to be connected to one of said pulse sources; said slow acting release means including means responsive to a signal received over said trunk of more than said predetermined duration for causing said connection to be released; and said pulse counting means including means responsive to a signal received over said trunk of less than said predetermined duration for causing said signal indicating device in response to the receipt of a predetermined number of pulses from said pulse source to be changed back to its first condition, independently of the termination of the signal received over said trunk, and said counting means to be prepared for a new counting operation under the control of another signal received over said trunk.

13. A telephone system comprising a calling operator's position in one office; a called operator's position in another office; an inter-office trunk; means for setting up a connection over said trunk between said calling and called operators; signal transmitting means at the calling end and signal receiving means at the called end of said trunk; disconnect means under the control of said calling operator for causing said signal transmitting means to transmit over said trunk a signal of more than a predetermined duration; signaling means under the control of said calling operator for sending a control signal to said signal transmitting means, said last mentioned means being means responsive to said control signal for transmitting a signal over said trunk which is limited to a duration less than said predetermined duration irrespective of the length of said control signal; slow acting release means, a plurality of pulse sources of pulsing rates such as used for the intermittent operation of switchboard lamps, and pulse counting means also at said called end of the trunk; a cord circuit at said called operator's position, a supervisory lamp associated with said cord circuit, a bridge-connected relay in said cord circuit controlling said supervisory lamp; said signal receiving means including means responsive to receipt of a signal from said transmitting means after said connection has been set up to said cord circuit for causing said slow acting release means to be set in action, said loop circuit to be opened to light said supervisory lamp and said pulse counting means to be connected to one of said pulse sources; said slow acting release means including means responsive to a signal received over said trunk of more than said predetermined duration to cause said connection to be released; and said pulse counting means including means responsive to a signal received over said trunk of less than said predetermined duration for causing said loop circuit in response to the receipt of a predetermined number of pulses from said pulse source to be reclosed and said supervisory lamp extinguished independently of the termination of the signal received over said trunk, and said counting means to be prepared for a new counting operation under the control of another trunk.

14. In a circuit-controlling device, the combination of a circuit having at least a first and a second condition; a first and a second source of pulses; means for changing said circuit from said first to said second condition responsive to the reception of the beginning of a first pulse from said first pulse source; and means for restoring said circuit from said second to said first condition only at the end of the last of a predetermined number of pulses received from said second pulse source.

15. In a circuit-controlling device, the combination of a circuit having at least a first and a second condition; a first and a second pulse source; means responsive to the receipt of the beginning of a first pulse from said first source for initiating the action of said device and for changing the status of said circuit from said first to said second condition; and means operated only in response to the termination of the last of a predetermined number of pulses received from said second pulse source operative to restore said device to its unactuated condition, and to restore said circuit from said second to said first condition.

16. In a circuit-controlling device, the combination of a circuit having at least a first and a second condition; a first and a second pulse source; means responsive to the receipt of the beginning of a first pulse from said first source for initiating the action of said device and for changing the status of said circuit from said first to said second condition; means responsive to said initiation for arranging said device to be actuated responsive to the receipt of pulses from said second pulse source; and means operated only in response to the termination of the last of a predetermined number of pulses received from said second pulse source operative to restore said device to its unactuated condition, and to restore said circuit from said second to said first condition.

17. In a circuit-controlling device, the combination of a circuit having at least a first and a second condition; a first and a second pulse source; a differential relay; means responsive to the reception of the beginning of a first pulse from said first pulse source for changing said circuit from said first to said second condition and for actuating said differential relay; a first relay arranged to be operated responsive to the operation of said differential relay and the reception of a first pulse from said second pulse source; a second relay arranged to be operated responsive to the operation of said first relay and to the termination of said first pulse; said differential relay being arranged to be released through differential energization, and to release said first relay, responsive to the operation of said second relay and reception of a second pulse from said second pulse source, and said second relay being arranged to be released and to revert said circuit from said second to said first condition responsive only to the termination of said second pulse.

18. In a circuit-controlling device, the combination of a circuit having at least a first and a second condition; a first and a second pulse source; a differential relay having first and second windings; first and second relays each having first and second non-differential windings; means responsive to the receipt of a pulse from said first pulse source for changing said circuit from said first to said second condition, and for energizing said first winding of said differential relay; said first winding of said first relay being arranged to be energized upon receipt of a first pulse from said second pulse source subsequent to the energization of said first winding of said differential relay, and to be energized in series with a first winding of said second relay upon the termination of said first pulse from said second pulse source; the respective second windings of said differential, first and second relays being arranged to be energized through contacts of said second relay upon receipt of a second pulse from said second pulse source, thereby causing said differential relay to release; and said second windings of said first and second relays being arranged to restore said circuit from said second to said first condition and to restore said first and second relays to their original unactuated condition upon termination of said second pulse from said second source.

19. In a telephone system, a first exchange; an operator position thereat; a second exchange; an operator position at said second exchange; a trunk line extending between said first and second exchanges; a first source of pulses at said first exchange; means controlled from said operator position at said first exchange for transmitting a pulse from said first source to said second exchange; said trunk having a talking loop connectively associated therewith at said second exchange; means at said second exchange for opening said talking loop responsive to the reception of said pulse from said first exchange; a signal device at said second exchange operatively associated with said trunk; means responsive to said opening of said loop for operating said signal device; a continuously-operated source of timing pulses; and means responsive to said opening for maintaining said loop open until the last of a predetermined number of timing pulses received from said source of timing pulses is terminated.

20. In a telephone system, a first exchange; an operator position thereat; a second exchange; an operator position at said second exchange; a trunk line extending between said first and second exchanges; a first source of pulses at said first exchange; means controlled from said operator position at said first exchange for transmitting a pulse from said first source to said second exchange; said trunk having a talking loop connectively associated therewith at said second exchange; means at said second exchange for opening said talking loop responsive to the reception of said pulse from said first exchange; a signaling device at said second exchange operatively associated with said trunk; means responsive to said opening of said loop for operating said signaling device; a continuously-operated source of timing pulses; a differential relay at said second exchange operated responsive to the receipt of said pulse from said first exchange, and released responsive to the receipt of the last of a predetermined number of said timing pulses; said differential relay being arranged to maintain said loop open during its actuated period; a non-differential relay operatively associated with said differential relay, said non-differential relay cooperating to maintain said loop open until the termination of said second pulse, whereby said signaling device is operated from the reception of said pulse from said first exchange to the termination of said second pulse from said timing pulse source.

21. In a telephone system, a first exchange; an operator position thereat; a second exchange; an operator position at said second exchange; a trunk line extending between said first and second exchanges; a first source of pulses at said first exchange; means controlled from said operator position at said second exchange for transmitting a pulse from said first source to said second exchange; said trunk having a talking loop connectively associated therewith at said second exchange; means at said second exchange for opening said talking loop responsive to the reception of said pulse from said first exchange; a signaling device at said exchange operatively associated with said trunk; means responsive to said opening of said loop for operating said signaling device; a differential relay at said second exchange operated responsive to the receipt of said pulse from said first exchange and effective to maintain said loop open during energization of said differential relay; a continously-operated source of timing pulses; a first non-differential relay at said second exchange arranged to be operated responsive to the operation of said differential relay and the reception of a first timing pulse from said source of timing pulses; a second non-differential relay at said second exchange arranged to be operated responsive to the operation of said first non-differential relay and the receipt of a second timing pulse from said source of timing pulses, and to be de-energized at the end of said second timing pulse, said second non-differential relay being further arranged to cause the release of said differential relay responsive to the receipt of said second pulse, to maintain said loop open during the energization of said second non-differential relay, and to revert said first non-differential relay to its unactuated condition at the termination of said second pulse, whereby said signaling device is operated from the reception of said pulse from said first exchange to the termination of said second pulse from said timing pulse source.

22. In a telephone system, a first and a second exchange; a first operator at said first exchange; a second operator at said second exchange; a trunk extending between said first and said second exchanges; a first source of pulses of predetermined duration and a source of alternating voltage at said first exchange; means for transmitting a pulse from said first source of pulses to said second exchange responsive to the application by said first operator of said alternating voltage to said trunk at said first exchange; a cord circuit connectively associated with said trunk at said second exchange; a talking circuit connectively associated with said cord circuit; a signaling device at said second exchange operatively associated with said cord circuit; means in said cord circuit for operating said signaling device when said talking circuit is opened; a continuously-operated second source of pulses, said second source having no connective relationship with said trunk; differential relay means operatively cooperative with non-differential relay means to open said talking loop responsive to the reception at said second exchange of said pulse from said first exchange and to maintain said loop open until the last of a plurality of pulses has been received at said second exchange from said source of pulses, whereby said signaling device is operated from the reception of said pulse from said first exchange until the termination of said last pulse.

References Cited in the file of this patent

UNITED STATES PATENTS

| | | |
|---|---|---|
| 1,039,988 | Molina | Oct. 1, 1912 |
| 2,140,601 | Serriere | Dec. 20, 1938 |
| 2,168,198 | Frink | Aug. 1, 1939 |
| 2,236,276 | Stewart | Mar. 25, 1941 |
| 2,405,597 | Miller | Aug. 13, 1946 |
| 2,502,687 | Weiner | Apr. 4, 1950 |

FOREIGN PATENTS

| | | |
|---|---|---|
| 588,402 | Great Britain | May 21, 1947 |